(No Model.)
G. S. GATES.
APPARATUS FOR DRAFTING THE ARM SIZE OF GARMENTS.
No. 310,666. Patented Jan. 13, 1885.
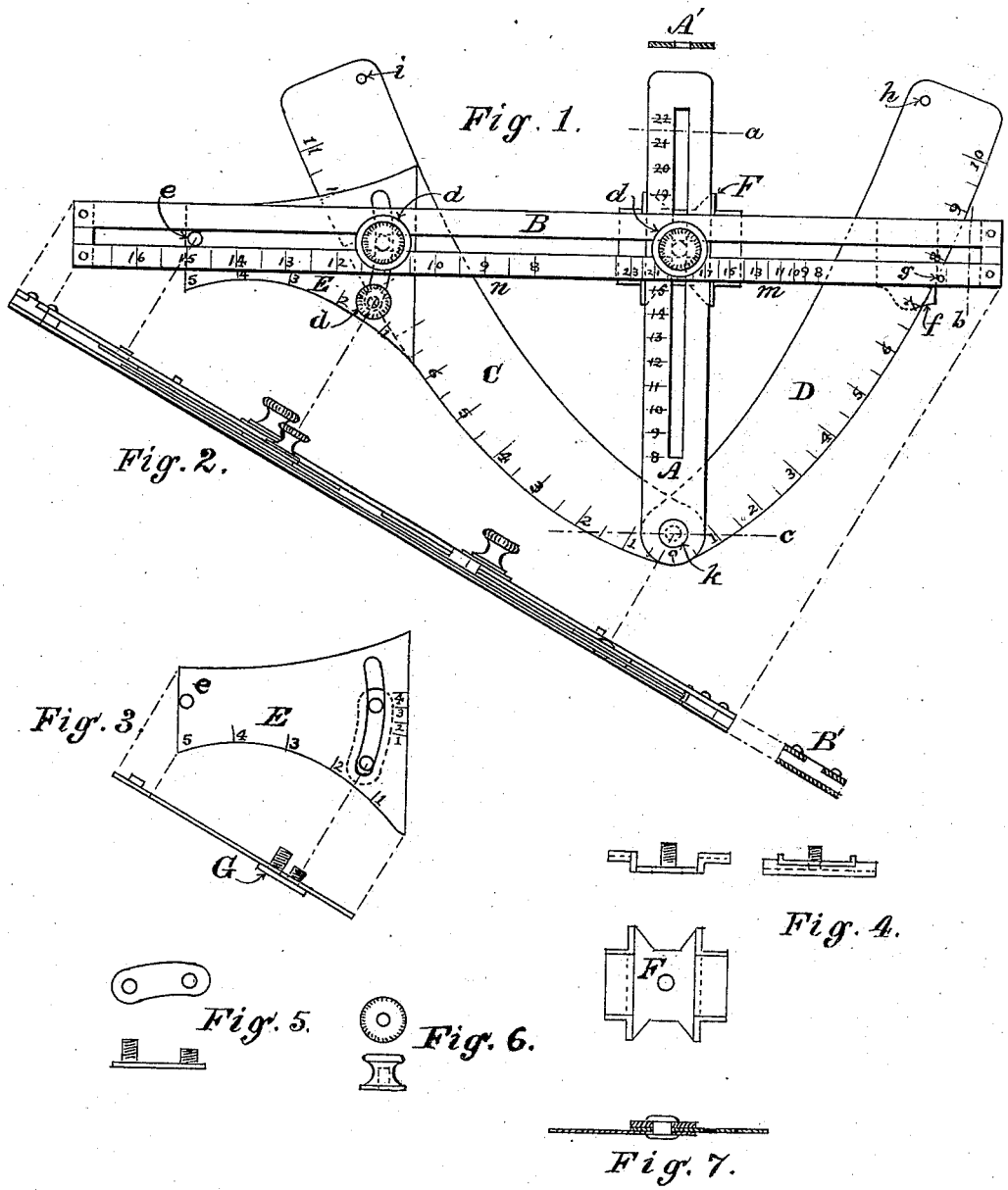
Witnesses.
Edwin J. Shard
Inventor.
George Shattuck Gates

UNITED STATES PATENT OFFICE.

GEORGE SHATTUCK GATES, OF ATHOL, MASSACHUSETTS.

APPARATUS FOR DRAFTING THE ARM-SIZE OF GARMENTS.

SPECIFICATION forming part of Letters Patent No. 310,666, dated January 13, 1885.

Application filed September 11, 1884. (No model.)

*To all whom it may concern:*

Be it known that I, GEORGE SHATTUCK GATES, a citizen of the United States, residing at Athol, in the county of Worcester and State of Massachusetts, have invented certain new and useful Improvements in Apparatus for Drafting the Arm-Size of Garments—that the same has not, according to my knowledge and belief, been patented in any country, and has not been in public use in the United States for more than two years prior to this application; and I do hereby declare that the following is a full, clear, and exact description of the invention, which will enable others skilled in the art to which it appertains to make and use the same.

Heretofore much trouble has been given in drafting the top of a sleeve, or part attached to body of garment.

The object of my invention is to form a proper curve for the arm-size and top of sleeves of garments from the dimension of the arm as a base.

The nature of my invention is a device to aid in drafting the arm-size and top of sleeves of garments. I attain my object by the use of a system of pivoted curves attached to two cross-scales, which the operator can quickly and accurately adjust to the different dimensions given by actual measurement of individuals.

Figure 1 is a plan of apparatus. Fig. 2 is an edge view; Figs. 3, 4, 5, 6, and 7, views of details.

Similar letters refer to similar parts in the different views.

In Fig. 1, A is a slotted scale, to which are pivoted at K the curves C and D. The length of the curves C and D are graduated from the pivot end, K, and may be provided with studs *i h*, or other suitable means, to prevent their swinging clear of the slot in B.

A' is a sectional view of A on line *a*.

Fig. 7 is a sectional view through pivot K of scale A and curves C and D.

B is a guide-piece, having a scale of inches, *n*, graduated from the pin or stop *g*, the point of intersection of curve D with edge of B. The small piece *f* at pin *g* gives a little surplus cloth at the seam.

B is slotted to receive the scale A and free ends of curves C and D. The upper part of B is also slotted to receive the thumb-screw studs of clamps F and G and stud *e* of curve E.

B', Fig. 2, is a sectional view of B on line *b*, Fig. 1.

E, Figs. 1 and 3, is a slotted curve, provided with the adjustable clamp G and pivot-stud *e*. E slides in and is guided by the slots of B.

F, Figs. 1 and 4, is a clamp and guide for scale A, sliding in the slots of B, and provided with a thumb-screw.

G, Figs. 3 and 5, is a clamp sliding in the slots of B, and provided with two thumb-screws, one holding it to the curve E and the other to the scale B.

In using this device the end of the curve E is slipped to the point on scale *n* corresponding to the dimension of the arm, and secured by thumb-screw of clamp G. The point of the shoulder and position of the curves C and D are fixed by the scales A and *m*, stop *g*, and curve E, D being placed against the stop *g*, and C made tangent to E.

The scale marked 1 2 3 4, Fig. 3, determines fullness at back below the point of shoulder.

Having fully described my invention, what I desire to claim and secure by Letters Patent is—

1. The combination of two cross-scales sliding one upon the other, so that the end of one moves parallel and perpendicular to the length of the other, one of the scales having pivoted to it two curves, and the other carrying a sliding curve, the sliding curve and cross-scales being provided with suitable clamps for holding them in any desired position, substantially as described.

2. The combination of cross-scales and pivoted curves for drafting the curve of the arm-size of garments, which gives the length of such curve and the length of a right line joining its extreme ends, substantially as described.

GEORGE SHATTUCK GATES.

Witnesses:
EDWIN J. SHAW,
CHS. FIELD.